(12) United States Patent
Scouller et al.

(10) Patent No.: US 9,424,176 B2
(45) Date of Patent: Aug. 23, 2016

(54) ROBUST SECTOR ID SCHEME FOR TRACKING DEAD SECTORS TO AUTOMATE SEARCH AND COPYDOWN

(71) Applicant: Freescale Semiconductor, Inc., Austin, TX (US)

(72) Inventors: Ross S. Scouller, Austin, TX (US); Jeffrey C. Cunningham, Austin, TX (US); Horacio P. Gasquet, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 627 days.

(21) Appl. No.: 13/776,052

(22) Filed: Feb. 25, 2013

(65) Prior Publication Data

US 2014/0244895 A1 Aug. 28, 2014

(51) Int. Cl.
*G06F 12/00* (2006.01)
*G06F 12/02* (2006.01)

(52) U.S. Cl.
CPC ..... *G06F 12/0246* (2013.01); *G06F 2212/7209* (2013.01)

(58) Field of Classification Search
CPC .................. G06F 12/0246; G06F 2212/7209
See application file for complete search history.

(56) References Cited

U.S. PATENT DOCUMENTS

| | | | |
|---|---|---|---|
| 5,784,611 A | 7/1998 | Thantrakul | |
| 6,904,400 B1 * | 6/2005 | Peri | G11C 16/102 365/185.3 |
| 7,058,755 B2 | 6/2006 | Nallapa | |
| 7,190,617 B1 | 3/2007 | Harari et al. | |
| 7,406,558 B2 | 7/2008 | Przybylek | |
| 7,600,090 B2 | 10/2009 | Cohen et al. | |
| 8,010,854 B2 | 8/2011 | McGinty et al. | |
| 8,131,914 B2 | 3/2012 | Kruecken | |
| 8,250,319 B2 | 8/2012 | Scouller et al. | |
| 8,255,616 B2 | 8/2012 | Scouller et al. | |
| 8,271,719 B2 | 9/2012 | Scouller et al. | |
| 8,341,372 B2 | 12/2012 | Scouller et al. | |
| 2007/0143528 A1 | 6/2007 | Przybylek | |
| 2010/0011155 A1 | 1/2010 | Kitagawa | |
| 2011/0107009 A1 * | 5/2011 | Scouller | G06F 11/08 711/103 |
| 2011/0173373 A1 * | 7/2011 | Scouller | G06F 12/0246 711/103 |
| 2011/0271034 A1 | 11/2011 | Scouller et al. | |
| 2012/0005403 A1 | 1/2012 | Scouller et al. | |
| 2012/0131262 A1 | 5/2012 | He et al. | |
| 2013/0268717 A1 * | 10/2013 | Scouller | G06F 12/0246 711/103 |

OTHER PUBLICATIONS

Freescale Semiconductor, Inc., Overview of the MC9S12XE Emulated EEPROM, Application Note AN3490, Rev. 0, Sep. 2007.
Freescale Semiconductor, Inc., M. Grant, Emulated EEPROM Quick Start Guide, Application Note AN3743, Rev. 0, Oct. 2008.

(Continued)

*Primary Examiner* — Aracelis Ruiz

(57) ABSTRACT

A brownout tolerant EEPROM emulator (18) manages memory operations at a volatile memory (20) and non-volatile memory (24) using a plurality of sector status bits (451) and forward/reverse skip flags (452, 453) stored in a sector identification record (45) of each sector to define a plurality of status indicators arranged sequentially to specify a plurality of sector configuration states for each memory sector, and to automatically bypass one or more dead sectors in the non-volatile memory array during forward copydown and reverse search operations.

10 Claims, 6 Drawing Sheets

(56) References Cited

OTHER PUBLICATIONS

Freescale Semiconductor, Inc., J, Cisneros et al., MC9S12XHY—Familty Demonstration Lab Training, Application Note AN4236, Rev. 0, Nov. 2010.
R.S. Scouller et al., U.S. Appl. No. 13/616,922, filed Mar. 26, 2012 entitled Systems and Methods for Code Protection in Non-Volatile Memory Systems.
J.C. Cunningham et al., U.S. Appl. No. 13/595,282, filed Feb. 2, 2012, entitled Adaptive Error Correction for Non-Volatile Memories.
R.S. Scouller et al., U.S. Appl. No. 13/457,669, filed Oct. 24, 2011, entitled Emulated Electrically Erasable Memory Parallel Record Management.
R.S. Scouller et al., U.S. Appl. No. 13/530,169, filed Oct. 18, 2011, entitled Emulated Electrically Erasable Memory Having an Address RAM for Data Stored in Flash Memory.
J. Cunningham et al, U.S. Appl. No. 13/441,335, filed Sep. 15, 2011, entitled Smart Charge Pump Configuration for Non-Volatile Memories.
R.S. Scouller et al., U.S. Appl. No. 13/442,028, filed Aug. 28, 2011, entitled Emulated Electrically Erasable Memory Having Sector Management.

* cited by examiner

| SECTOR CLASSIFICATION | SECTOR STATUS BITS (90:61) | ORED SECTOR STATUS BITS (70:61) | REVERSE SKIP (+ECOUNT) (60:22) | FORWARD SKIP (21:0) | |
|---|---|---|---|---|---|
| ERASED | 111_111_111_111_111_111_111_111_111_111 | 11_1111_1111 | FFFF_FF | FFFF | ← 221 |
| READY (FIRST PROGRAM) | 111_111_111_111_111_111_111_111_111_111 | 11_1111_1111 | 0,1,2 (+ECOUNT) | 0,1,2 | ← 222 |
| READY | 111_111_111_111_111_111_111_111_111_000 | 11_1111_1110 | 0,1,2 (+ECOUNT) | 0,1,2 | ← 223 |
| FILLING (FIRST PROGRAM) | 111_111_111_111_111_111_111_111_000_000 | 11_1111_1100 | 0,1,2 (+ECOUNT) | 0,1,2 | ← 224 |
| FILING | 111_111_111_111_111_111_111_000_000_000 | 11_1111_1000 | 0,1,2 (+ECOUNT) | 0,1,2 | ← 225 |
| PREVIOUS SECTOR BEING ERASED | 111_111_111_111_111_111_000_000_000_000 | 11_1111_0000 | 0,1,2 (+ECOUNT) | 0,1,2 | ← 226 |
| PREVIOUS SECTOR QUALIFIED ERASE | 111_111_111_111_111_000_000_000_000_000 | 11_1110_0000 | 0,1,2 (+ECOUNT) | 0,1,2 | ← 227 |
| PREVIOUS SECTOR ERASE COMPLETE | 111_111_111_111_000_000_000_000_000_000 | 11_1100_0000 | 0,1,2 (+ECOUNT) | 0,1,2 | ← 228 |
| ERASE COMPLETED | 111_111_111_000_000_000_000_000_000_000 | 11_1000_0000 | 0,1,2 (+ECOUNT) | 0,1,2 | ← 229 |
| COMPRESS (FIRST PROGRAM) | 111_111_000_000_000_000_000_000_000_000 | 11_0000_0000 | 0,1,2 (+ECOUNT) | 0,1,2 | ← 230 |
| COMPRESS | 111_000_000_000_000_000_000_000_000_000 | 10_0000_0000 | 0,1,2 (+ECOUNT) | 0,1,2 | ← 231 |

ROBUST SECTOR ID SCHEME FOR TRACKING DEAD SECTORS TO AUTOMATE SEARCH AND COPYDOWN

BACKGROUND OF THE INVENTION

1. Field of the Invention

The present invention is directed in general to flash memories and methods for operating same. In one aspect, the present invention relates to a system and method of using flash memory to emulate Electrically Erasable Programmable Read Only Memory (EEPROM).

2. Description of the Related Art

Electrically erasable, programmable, read-only memory (EEPROM) is a type of non-volatile memory (NVM) used with microcontrollers, microprocessors, computers and other electronic devices (such as automotive embedded controllers) to store data. EEPROM is typically characterized by the ability to erase and write individual bytes of memory many times over, with programmed locations retaining their data over an extended period when the power supply is removed. However, because of the increased cost and size requirements and manufacturing difficulties for EEPROM memories, some devices emulate EEPROM memory using a portion of a sector or block of erasable flash memory to mirror information stored in a RAM, so that the stored information is maintained in flash memory when the device is not powered. However, there continue to be challenges with overcoming flash memory cycling and reliability that that can adversely affect the integrity of emulated EEPROM data stored in the flash array, such as when power is unstable (referred to as "brownouts") and asynchronous resets at the device can cause corruption of the mirrored information at the flash memory. In addition, flash memory latent defects may result in a flash operation failure for a sector after extensive program and erase cycles prevent a program or erase error from being resolved, in which case the "dead" sector is declared as invalid and is dropped from the operational flow. While sector identification schemes for EEPROM emulation have been proposed to use status bits interleaved with sector erasure operations to enable the determination of start, stop and sector status within a system, these schemes have been found to have weaknesses during update steps and do not provide the ability to track dead sectors in the flash memory.

BRIEF DESCRIPTION OF THE DRAWINGS

The present invention may be understood, and its numerous objects, features and advantages obtained, when the following detailed description is considered in conjunction with the following drawings, in which:

FIG. 2 is a table illustrating sector status classifications and associated sector header codes which may be used to provide sector status information and to mark one or more upcoming dead sectors in accordance with selected embodiments of the present disclosure;

DETAILED DESCRIPTION

Figure 1:
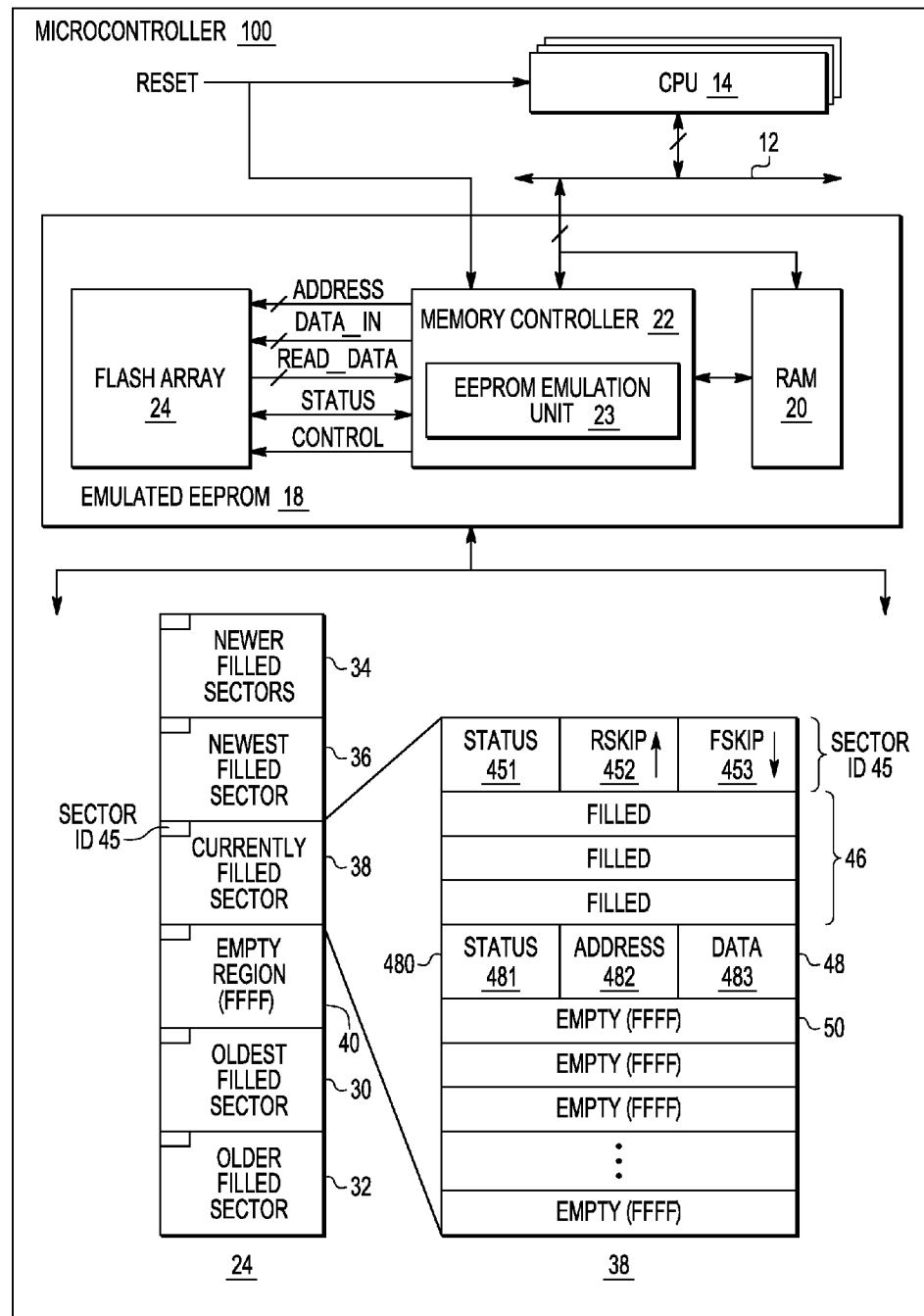
FIG. 1 is a schematic block diagram of a microcontroller architecture which implements an emulated EEPROM with a sector status identification scheme for tracking dead sectors.

A method, system and apparatus are described for performing EEPROM emulation to store information at a non-volatile memory using a robust sector identification scheme to track dead sectors or blocks of records by storing a plurality of status bits for each sector programming operation along with a pair of offsets flags or markers at a sector identification header to allow for forward or reverse passage around a dead sector. By interleaving sector program operations with the programming of a plurality of status bits in the sector identification header which define a plurality of status indicators arranged sequentially to specify a plurality of sector configuration states for the sector, a brownout or other corrupting event during a program operation may be indicated by the failure to store one of the status bits. And by storing each status indicator as a plurality of bits which are logically combined (e.g., via an OR operation), the sector state detection scheme is immune to program disturb or individual bit erase defects. Brownout tolerance may also be promoted by defining unique sector status update steps which align with the plurality of status bits to sequentially track the lifecycle of a sector in an emulated EEPROM system. In selected embodiments, each sector's life progression is marked by two distinct program operations to make them brownout tolerant and to track dead sectors during automated search and copy down routines by programming each sector identification header with two offsets flags to allow for forward or reverse passage through the sector and to warn of an impending encounter with a dead sector.

In this disclosure, an improved system, apparatus, and fabrication method are described for emulated EEPROM memory devices that address various problems in the art where various limitations and disadvantages of conventional solutions and technologies will become apparent to one of skill in the art after reviewing the remainder of the present application with reference to the drawings and detailed description provided herein. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system or similar electronic computing device, state machine, electronic circuit, logic, firmware, application specific integrated circuit (ASIC), or computing circuitry or module that manipulates and transforms data represented as physical (electronic) quantities within the computer system's registers and memories into other data similarly represented as physical quantities within the computer system memories or registers or other such information storage, transmission or display devices.

FIG. 1 is a schematic block diagram of a data processing device architecture 100 which includes an emulated EEPROM device 18 for providing the non-volatile storage functionality of EEPROM memory while masking the restrictions and disadvantages of using non-volatile EEPROM memory or flash memory as the sole memory storage. As depicted, the emulated EEPROM device 18 includes a volatile random access memory (RAM) 20, memory controller 22, and flash array memory 24 connected and controlled by an EEPROM emulation unit 23 in the memory controller 22. As will be appreciated, the EEPROM emulation unit 23 may be implemented in whole or in part as a software driver in selected embodiments, and may be implemented in whole or in part as hardware in other embodiments. In operation, the EEPROM emulation unit 23 implements a sector status identification scheme for tracking dead sectors in accordance with selected embodiments of the present disclosure. Implemented as software, hardware, firmware or any combination of the foregoing, the EEPROM emulation unit provides random memory access at RAM 20 in combination with emulated EEPROM functionalities with the flash array 24, such as organizing data records, initializing and de-initializing EEPROM, reporting EEPROM status, and reading, writing, and deleting data records. In any software implementation, the software may be executed by a separate processor (e.g., 14) or by a processor or controller (not shown) in the emulated EEPROM device 18.

In the example shown in FIG. 1, the data processing device 100 may be implemented as a microcontroller (e.g., an embedded automotive controller) which includes one or more CPU or processor cores 14 and an emulated EEPROM device 18 for programmably storing non-volatile data. The CPU(s) 14 and emulated EEPROM device 18 are connected together via one or more busses or system interconnect(s) 12 to store data (e.g., diagnostic data, adaptive control data, and/or security data) that is written frequently during the microcontroller lifetime, requiring a high program/erase endurance of many thousand cycles. To avoid the costs and disadvantages associated with using conventional EEPROM memory to store non-volatile data, the emulated EEPROM device 18 is provided to programmably store non-volatile data using a random access memory (RAM) 20, a memory controller 22, and a non-volatile flash memory array 24 for storing a plurality of flash memory blocks or sectors, each of which includes one or more EEPROM data records. In selected embodiments, flash array 24 may be implemented as NAND flash, NOR flash, or another type of non-volatile memory. The data records stored in the flash memory array 24 refer to a collection of data items or fields arranged for processing as if stored in an EEPROM, and may include a data record status field, a data record ID field, a data size field and one or more data fields. The specific arrangement of the EEPROM data record is prescribed by the application program that processes it, and may include both fixed-length and variable length records.

In the depicted emulated EEPROM device 18, the memory controller 22 is connected to non-volatile flash array 24 via signal lines labeled ADDRESS, DATA_IN, READ_DATA, STATUS, and CONTROL. Though not shown, memory controller 22 may be connected to random access memory (RAM) 20 via similar signal lines. RAM 20 and memory controller 22 are also connected to system interconnect 12. In addition, a reset signal may be provided to CPU(s) 14 and memory controller 22. The reset signal may be, for example, a global reset signal for data processing device 100. Memory controller 22 includes an EEPROM emulation driver and/or hardware module 23 having program code and/or circuitry for implementing the sector status identification scheme for tracking dead sectors. For the purpose of illustration, emulated EEPROM device 18 is shown as a discrete device, but the emulated EEPROM device 18 may be implemented as an integrated circuit that includes other components of data processing device 100, such as processor 14. As will be appreciated, the emulated EEPROM device 18 may be implemented as a standalone flash module having its own processing functionality or with microcontrollers, microprocessors, computers and other electronic devices which use flash memory to emulate EEPROM memory.

In support of data access requests to the RAM 20, the memory controller 22 is configured to store and retrieve information at flash array 24. Memory controller 22 can store information at flash array 24 by providing an address via node ADDRESS, writing data via node DATA_IN, updating status information for a sector or record via node STATUS, and configuring control information at node CONTROL. Similarly, memory controller 22 can retrieve information stored at flash array 24 by providing an address at node ADDRESS and configuring control information at node CONTROL to perform a read operation at flash array 24 whereby the information stored at the address is returned to control module 22 via node READ_DATA and associated status information for the corresponding sector or record is returned via node STATUS. Memory controller 22 can include a data processing device such as a microprocessor, a microcontroller, logic devices, or a combination thereof that is configured to administer the procedures associated with memory controller 22.

During operation, processor 14 (or some other module or device with memory access privileges) can communicate directly with RAM 20 via system interconnect 12 to store and retrieve information at RAM 20 via an access request. In this setting, an access request to store information at the RAM 20 is a "write access," and an access request to retrieve information stored at the RAM 20 is a "read access." Each access request includes an access address corresponding to a location at RAM 20. In the case of a write access, the access request also includes data information that is to be written to the provided address. In response to a write access, RAM 20 stores the received write data at a memory location associated with the received write address. In response to a read access, RAM 20 retrieves the data stored at the memory location indicated by the address and provides the data via system interconnect 12.

In the case of a write access, memory controller 22 will store the data associated with the write access at flash array 24. The data will thus be preserved in the event of a power fluctuation (including a power loss) or reset event at the data processing device 100. For example, if the memory controller 22 determines that data associated with a write request is different than the data stored at the memory location of the RAM 20 indicated by the address associated with the write request, the memory controller 22 may store both the address and the data associated with the write request as a record at the flash array 24. But if flash array 24 cannot erase an individual record, the memory controller 22 generates a new record for each write access that results in modification of data stored at the RAM 20. As a result, there may be a plurality of records associated with a particular memory location of RAM 20, in which case the most recently created record associated with a particular memory address stores the most up-to-date or valid data for that address, and any data associated with an address of RAM 20 that has been replaced by newer data is referred is invalid.

In creating new records, the memory controller 22 operates a sequential manner whereby each new record is stored at a location logically adjacent and immediately following the location used to store the record created in response to the preceding write access. As data is stored at RAM 20 and successive records corresponding to the updates are created at flash array 24, the available space to store information at flash array 24 is reduced. To provide sufficient storage space in the flash memory for new records, the memory controller 22 may be configured to determine when the amount of space available at flash array 24 is below a defined or programmable threshold. When the threshold is reached, the memory controller 22 performs data consolidation and data erasure in selected sectors or blocks to ensure that there are empty locations that are sequential to the most recently updated location and that are available to accommodate new records in response to data updates at RAM 20. The process for managing flash sectors by successively creating new records, consolidating records, and erasing sectors is performed to make new sectors available for storing data records in the flash array 24.

In FIG. 1, the process for managing the flash sectors in a non-volatile flash memory 24 in an emulated EEPROM device 18 is illustrated with reference to the plurality of flash memory blocks or sectors 30, 32, 34, 36, and 38 (sectors 30-38) wherein a sector is logically contiguous portion of flash array 24 for storing one or more records. Flash array 24 may also include an empty region 40, which includes one or more empty sectors. An empty sector refers to a sector where all locations allotted for storing records are erased. The illustrated sectors 30-38 include an oldest sector 30 (the sector that was least-recently filled), an older sector 32 (the sector that was filled after filling oldest sector 30), one or more newer filled sectors 34 (the sector(s) filled more recently than the older sector 32), a newest-filled sector 36 (the sector that was most recently filled), and a currently filling sector 38. Each of the filled sectors 30, 32, 34, and 36 includes no empty locations in the sense that all locations contain either a record or contain status information associated with the sector, though it will be appreciated that a record in a filled sector may include empty space available to store additional data for the address associated with the record.

The currently filling sector 38 is the sector which will store the next or "new" record created in flash array 24. By way of illustration, the currently filling sector 38 may include a first location or record 45 for storing sector identification header codes which may be used to provide sector status information and to mark one or more upcoming dead sectors). The first location 45 may be a first sector header or record which includes a first field 451 for storing a plurality of status bits, a second field 452 for storing a reverse skip or offset flag for avoiding one or more adjacent dead sectors in a reverse direction (alone or in combination with an erase count), and a third field 453 for storing a forward skip or offset flag for avoiding one or more adjacent dead sectors in a forward direction. The combination of fields 451-453 may be referred to as a sector header for the currently filling sector 38. As described hereinbelow, the plurality of status bits are sequentially written or programmed into the first field 451 so as to be interleaved with separate programming operations so that any brownout or other corrupting event occurring between writing or programming of the status bits will likely result in a failure to store the latter status bit(s) and thereby provide an indication of a failed programming operation.

The currently filling sector 38 may also include one or more second locations or records 46 in which are stored one or more records. In addition, the currently filling sector 38 may include a currently filling location or record 48 which includes a status information field 481, an address information field 482, and a data information field 483. Finally, the currently filling sector 38 may include one or more empty locations 50 illustrated parenthetically to include "FFFF," corresponding to the value of data present at locations included at erased sectors.

In an example programming operation for the currently filling sector 38, the memory controller 22 may use the currently filling sector 38 to perform data consolidation and data erasure in one or more sectors of the array 24 upon determining that the number of erased locations at flash array 24 available to store new records is below a threshold. When this threshold is met, the memory controller 22 may perform a consolidation operation by reviewing each record at oldest filled sector 30 and then compressing and copying each valid record found therein to the currently filling location or record 48 in the currently filling sector 38. In particular, to copy a record, memory controller 22 performs a write access to create a new record at currently-filling sector 38 and writes the contents of the record being copied to the new record. Once memory controller 22 determines that all valid records have been copied from oldest filled sector 30 to currently filling sector 38, memory controller 22 performs an erase operation to erase oldest filled sector 30. Thus, the consolidation operation frees space for additional records to be stored at flash array 24.

Each sector 30-38 in the flash memory 24 may include a sector identification location or record (e.g., 45) that may be used to facilitate sector processing by storing sector status information along with offset flags to mark one or more upcoming dead sectors. In this way, memory controller 22 can access the sector status information associated with a sector to identify how the sector is currently being used. For example, the sector status information can be used to identify that a particular sector is empty, erased, currently filling or full, or being used for another purpose, such as compressing or erasing another sector. By interleaving the programming of status bits stored in the sector identification location/record, the emulated EEPROM device 18 provides a robust status system that is brownout tolerant and more immune to single bit wear out mechanisms and disturb issues. This is achieved through using multiple physical bits allocated per status bit to define a comprehensive plurality of configuration state definitions. The emulated EEPROM device 18 may also process the offset flags in the sector identification location/record to manage the presence of dead sectors in the flash array 24 such that automated search algorithms can be used.

Turning now to FIG. 2, there is illustrated a table 200 of sector status classifications and associated sector header codes which may be used to provide sector status information and to mark one or more upcoming dead sectors in accordance with selected embodiments of the present disclosure. Table 200 includes a first column 210 containing sector classifications, a second column 212 containing example sector status bits (in binary form) associated with each sector classification, and a third column 214 containing "OR-ed" groupings of the status bits from the second column 212. In selected embodiments, the memory controller 22 is configured to update sector status bits in the sector header corresponding to the second column 212 or to the third column 214 as the sector classification progresses through a sequence of program operations. In embodiments where the status bits used to store records at flash array 24 can only be programmed to a "logic zero" level, the sector status bits used to identify the current classification of a sector differ by how many status bits are programmed to a "logic zero" level. In an example embodiment illustrated in the second column 212 of table 200, the sector status bits used to identify a sector status includes thirty (30) status bits which may be arranged as ten status indicator groupings of three status bits each (e.g., FIRST SECTOR STATUS INDICATOR (2:0), SECOND SECTOR STATUS INDICATOR (5:3), ... TENTH SECTOR STATUS INDICATOR (30:28). As will be appreciated, additional or fewer groupings of status bits may be include in the sector status bits to identify additional or fewer status classifications. In this way, each of the groupings of three programmed status bits may be used to differentiate each sector status, alone or in combination with other information from the sector header code. In an example implementation, the sector status bits are contained in bit positions 90:61 of a sector identification header/record. Alternatively, the OR'ed sector status bits are contained in bit positions 70:61 of a sector identification header/record.

While the arrangement and assignment of status bit groupings shown in table 200 shows the same logical values for the ERASED and READY (FIRST PROGRAM) states, it will be appreciated that the status bits could be arranged and assigned so that each of the identified eleven configuration states has its own corresponding sector status bit(s). For example, the ERASED state could be assigned status bit configuration 111_111_111_111_111_111_111_111_111_111, the READY (FIRST PROGRAM) state could be assigned status bit configuration 111_111_111_111_111_111_111_111_111_000, the READY state could be assigned status bit configuration 111_111_111_111_111_111_111_111_000_000, and so on so that the COMPRESS state could be assigned status bit configuration 000_000_000_000_000_000_000_000_000_000.

As illustrated with the third column 214 of table 200, each sector status indicator grouping of sector bits may be represented with a corresponding logical sector status bit by applying a logical "OR" operation to each grouping of sector bits. By representing each logical sector status bit with three physical bits which are OR'ed together, the sector status information maintained at the emulated EEPROM device 18 achieves improved immunity to program disturbances (e.g., brownout), and also avoids problems arising from one of the status bits in a group having an erase issue.

The table 200 includes additional sector header codes which may be included in each sector identification header or record which may be used to mark one or more upcoming dead sectors. For example, table 200 includes a fourth column 216 containing example reverse skip codes or offset flag values for bypassing a dead sector in the reverse search direction. The reverse skip codes or offset flag values may be stored as binary or hexadecimal values to indicate the number of adjacent dead sectors to be skipped in a given direction (e.g., reverse direction). In selected embodiments, each reverse skip code may be combined with an ECOUNT (erase cycle count) value for the sector representing the number of times the sector has been erased. Whether combined with the ECOUNT value or not, the reverse skip codes may be protected with error correcting code (ECC) to detect and correct internal data corruption.

While the reverse skip codes can specify any desired number of dead sectors, in selected embodiments, the reverse skip codes are used to specify a maximum of two (2) dead sectors that can be skipped in the reverse direction by using four bits with two bits assigned to each skipped sector. In these embodiments, the reverse skip codes can effectively specify 0, 1, and 2 values corresponding to "no skip," "skip 1 sector," and "skip 2 sectors" instructions. In the unlikely event of three or more dead sectors occurring back to back, the memory controller 22 may be configured to reprogram the sector identification header/record to create an ECC double fault that will force software intervention. In an example implementation, the ECC-protected reverse skip codes and ECOUNT value are contained in bit positions 60:22 of a sector identification header/record.

The table 200 also includes a fifth column 218 which contains example forward skip codes or offset flags for bypassing a dead sector in the forward copydown direction. By storing the forward skip codes or offset flag values as binary or hexadecimal values, the number of adjacent dead sectors to be skipped in a given direction (e.g., forward direction) is indicated. In selected embodiments, the forward skip codes may be protected with error correcting code (ECC) to detect and correct internal data corruption. In selected embodiments, the forward skip codes are used to specify a maximum of two (2) dead sectors that can be skipped in the reverse direction, though any desired number of dead sectors can be specified by the forward skip codes. By using four bits with two bits assigned to each skipped sector, the forward skip codes can effectively specify 0, 1, and 2 values corresponding to "no skip," "skip 1 sector," and "skip 2 sectors" instructions. In the unlikely event of three or more dead sectors occurring back to back, the memory controller 22 may be configured to reprogram the sector identification header/record to create an ECC double fault that will force software intervention. In an example implementation, the ECC-protected forward skip codes are contained in bit positions 21:0 of a sector identification header/record.

With the arrangement of sector status bits illustrated in the second column 212 of table 200, the memory controller 22 may be configured to interleave distinct sector programming operations with the sequential programming of first and second groups of status bits. For example, during a first programming operation (e.g., configuring a sector as READY), a first group of status bits (e.g., FIRST SECTOR STATUS INDICATOR (2:0)) can be programmed, and during a subsequent programming operation (e.g., configuring a sector as FILLING (FIRST PROGRAM)), a second group of status bits (e.g., SECOND SECTOR STATUS INDICATOR (5:3)) can be programmed. This interleaved programming may be illustrated with reference to the rows 221-231 in the table 200.

In particular, a first row 221 in table 200 includes sector classification ERASED which may be represented as shown in the second column 212 with unprogrammed sector status bit values (e.g., 111_111_111_111_111_111_111_111_111_111) and reverse skip and ECOUNT values (e.g., FFFF_FF). As illustrated in the third column 214, the logical OR combination of three bit groups from the sector status bit values generates OR'ed sector status bit values (e.g., 11_1111_1111) corresponding to the ERASED sector status. In selected embodiments, the "logic one" values in the first set of sector status bit values and the first reverse skip and ECOUNT value are the result of a sector-erase operations, so memory controller 22 need not perform a separate program operation to store these values.

Row 222 in table 200 includes sector classification READY (FIRST PROGRAM) which may be represented as shown in the second column 212 with a set of sector status bit values having "logic one" values and with the ECOUNT value which has been incremented after the ERASE operation. In this way, the READY (FIRST PROGRAM) sector classification may be differentiated from the ERASED sector classification by the ECOUNT value in the fourth column 216. As illustrated in the third column 214, the logical OR combination of three bit groups from the sector status bit values generates OR'ed sector status bit values (e.g., 11_1111_1111) corresponding to this first program operation for the READY sector status, and the fourth and fifth columns 216, 218 contain the reverse and forward skip values (e.g., 0, 1, or 2) identifying adjacent dead sectors.

Row 223 in table 200 includes the sector classification READY (or EMPTY) which may be represented as shown in the second column 212 with a set of sector status bit values (e.g., 111_111_111_111_111_111_111_111_111_000) in which the least significant status bit or bit group (e.g., a three-bit group of status bits) are programmed to a "logic zero" level, thereby differentiating the READY sector classification from the READY (FIRST PROGRAM) sector classification. As illustrated in the third column 214, the logical OR combination of three bit groups from the sector status bit values generates OR'ed sector status bit values (e.g., 11_1111_1110) corresponding to this second program operation for the READY sector status, and the fourth and fifth columns 216, 218 contain the reverse and forward skip values (e.g., 0, 1, or 2) identifying adjacent dead sectors. The READY sector classification corresponds to sectors at, for example, EMPTY REGION 40 of FIG. 1.

Row 224 in table 200 includes the sector classification FILLING (FIRST PROGRAM) which may be represented as shown in the second column 212 with a set of sector status bit values (e.g., 111_111_111_111_111_111_111_111_000_000) in which the next least significant status bit or bit group (e.g., the fourth, fifth and sixth least significant status bits) are programmed to a "logic zero" level, thereby differentiating the FILLING (FIRST PROGRAM) sector classification from the READY sector classification. As illustrated in the third column 214, the logical OR combination of three bit groups from the sector status bit values generates OR'ed sector status bit values (e.g., 11_1111_1100) corresponding to this first program operation for the FILLING sector status, and the fourth and fifth columns 216, 218 contain the reverse and forward skip values (e.g., 0, 1, or 2) identifying adjacent dead sectors.

Row 225 in table 200 includes the sector classification FILLING (or FULL) which may be represented as shown in the second column 212 with a set of sector status bit values (e.g., 111_111_111_111_111_111_111_000_000_000) in which the next least significant status bit or bit group (e.g., the seventh, eighth, and ninth least significant status bits) are programmed to a "logic zero" level, thereby differentiating the FILLING sector classification from the FILLING (FIRST PROGRAM) sector classification. As illustrated in the third column 214, the logical OR combination of three bit groups from the sector status bit values generates OR'ed sector status bit values (e.g., 11_1111_1000) corresponding to this second program operation for the FILLING sector status, and the fourth and fifth columns 216, 218 contain the reverse and forward skip values (e.g., 0, 1, or 2) identifying adjacent dead sectors. The FILLING (or FULL) sector classification corresponds to sectors at, for example, CURRENTLY FILLING 38 of FIG. 1, and the FULL sector classification corresponds to filled sectors 30, 32, 34, and 36 of FIG. 1. In selected embodiments, additional status bits can be used to differentiate between the FILLING sector and FULL sectors. In other embodiments, the FILLING sector can be identified by memory controller 22 by searching backwards from the first empty sector to locate the first sector having sector status bit values=111_111_111_111_111_111_111_000_000_000.

Row 226 in table 200 includes the sector classification PREVIOUS SECTOR BEING ERASED which may be represented as shown in the second column 212 with a set of sector status bit values (e.g., 111_111_111_111_111_111_000_000_000_000) in which the next least significant status bit or bit group (e.g., the tenth, eleventh, and twelfth least significant status bits) are programmed to a "logic zero" level, thereby differentiating the PREVIOUS SECTOR BEING ERASED sector classification from the FILLING sector classification. As illustrated in the third column 214, the logical OR combination of three bit groups from the sector status bit values generates OR'ed sector status bit values (e.g., 11_1111_0000) corresponding to a previous sector, and the fourth and fifth columns 216, 218 contain the reverse and forward skip values (e.g., 0, 1, or 2) identifying adjacent dead sectors.

Row 227 in table 200 includes the sector classification PREVIOUS SECTOR QUALIFIED FOR ERASE which may be represented as shown in the second column 212 with a set of sector status bit values (e.g., 111_111_111_111_111_000_000_000_000_000) in which the next least significant status bit or bit group (e.g., the thirteenth, fourteenth, and fifteenth least significant status bits) are programmed to a "logic zero" level, thereby differentiating the PREVIOUS SECTOR QUALIFIED FOR ERASE sector classification from the PREVIOUS SECTOR BEING ERASED sector classification. As illustrated in the third column 214, the logical OR combination of three bit groups from the sector status bit values generates OR'ed sector status bit values (e.g., 11_1110_0000) corresponding to a second program operation for erasing the previous sector, and the fourth and fifth columns 216, 218 contain the reverse and forward skip values (e.g., 0, 1, or 2) identifying adjacent dead sectors.

Row 228 in table 200 includes the sector classification PREVIOUS SECTOR ERASE COMPLETE which may be represented as shown in the second column 212 with a set of sector status bit values (e.g., 111_111_111_111_000_000_000_000_000_000) in which the next least significant status bit or bit group (e.g., the sixteenth, seventeenth, and eighteenth least significant status bits) are programmed to a "logic zero" level, thereby differentiating the PREVIOUS SECTOR ERASE COMPLETE sector classification from the PREVIOUS SECTOR QUALIFIED FOR ERASE sector classification. As illustrated in the third column 214, the logical OR combination of three bit groups from the sector status bit values generates OR'ed sector status bit values (e.g., 11_1100_0000) corresponding to a third program operation for erasing the previous sector, and the fourth and fifth columns 216, 218 contain the reverse and forward skip values (e.g., 0, 1, or 2) identifying adjacent dead sectors.

Row 229 in table 200 includes the sector classification ERASE COMPLETED which may be represented as shown in the second column 212 with a set of sector status bit values (e.g., 111_111_111_000_000_000_000_000_000_000) in which the next least significant status bit or bit group (e.g., the nineteenth, twentieth, and twenty-first least significant status bits) are programmed to a "logic zero" level, thereby differentiating the ERASE COMPLETED sector classification from the PREVIOUS SECTOR ERASE COMPLETE sector classification. As illustrated in the third column 214, the logical OR combination of three bit groups from the sector status bit values generates OR'ed sector status bit values (e.g., 11_1000_0000) corresponding to a fourth program operation for erasing the previous sector, and the fourth and fifth columns 216, 218 contain the reverse and forward skip values (e.g., 0, 1, or 2) identifying adjacent dead sectors. The ERASE COMPLETED sector classification is stored at the FULL sector that was filled immediately after filling the oldest filled sector. For example, when erasing oldest filled sector 30 at FIG. 1, the older filled sector 32 of FIG. 1 is used to store sector status bit values=111_111_111_000_000_000_000_000_000_000.

Row 230 in table 200 includes the sector classification COMPRESS (FIRST PROGRAM) which may be represented as shown in the second column 212 with a set of sector status bit values (e.g., 111_111_000_000_000_000_000_000_000_000) in which the next least significant status bit or bit group (e.g., the twenty-second, twenty-third, and twenty-fourth least significant status bits) are programmed to a "logic zero" level, thereby differentiating the COMPRESS (FIRST PROGRAM) sector classification from the ERASE COMPLETED sector classification. As illustrated in the third column 214, the logical OR combination of three bit groups from the sector status bit values generates OR'ed sector status bit values (e.g., 11_0000_0000) corresponding to this first program operation for the COMPRESS sector status, and the fourth and fifth columns 216, 218 contain the reverse and forward skip values (e.g., 0, 1, or 2) identifying adjacent dead sectors.

Row 231 in table 200 includes the sector classification COMPRESS which may be represented as shown in the second column 212 with a set of sector status bit values (e.g., 111_000_000_000_000_000_000_000_000_000) in which the next least significant status bit or bit group (e.g., the twenty-fifth, twenty-sixth, and twenty-seventh least significant status bits) are programmed to a "logic zero" level, thereby differentiating the COMPRESS sector classification from the COMPRESS (FIRST PROGRAM) classification. As illustrated in the third column 214, the logical OR combination of three bit groups from the sector status bit values generates OR'ed sector status bit values (e.g., 10_0000_0000) corresponding to this second program operation for the COMPRESS sector status, and the fourth and fifth columns 216, 218 contain the reverse and forward skip values (e.g., 0, 1, or 2) identifying adjacent dead sectors. Note that, before a sector becomes an oldest filled sector and a candidate for being compressed and subsequently erased, it will have been an older filled sector, and have received sector status bit values=111_111_111_000_000_000_000_000_000_000 at the time that a previous oldest filled sector was being erased.

As described hereinabove, the sector header codes may be sequentially programmed to track the lifecycle progression of each sector status classification which proceeds with multiple distinct program operations, thereby providing the ability to detect and respond to potential brownouts or other corrupting events. For example, the sector status bits may be used, alone or in combination with an ECOUNT value, to detect potential brownout events that occur as an ERASED sector is configured as READY. In an example illustrated in FIG. 2, by programming the ECOUNT value and first grouping of three status bits (e.g., FIRST SECTOR STATUS INDICATOR (2:0) in a sequential manner, these sector header codes indicate that the READY (FIRST PROGRAM) and READY program operations have occurred to configure a given sector. But if the memory controller 22 retrieves sector header codes indicating that the ECOUNT value was programmed and that the first grouping of bits was not programmed, then this signals to the memory controller 22 that a brownout event may have occurred before the second program operation for the READY sector status program operation. This may occur if a brownout occurred while programming the status bits at the FIRST SECTOR STATUS INDICATOR (2:0), in which case the memory controller 22 classifies that sector as a newly erased sector and once again programs the status bits at the FIRST SECTOR STATUS INDICATOR (2:0) to identify the newly erased sector as an empty or READY sector.

In addition or in the alternative, the sequential programming of the sector status bits or bit groups (from least significant to more significant) allows each lifecycle progression of sector status classification to be implemented with two distinct program operations which can be tracked to detect potential brownouts or other corrupting events. For example, by programming the second and third groupings of three status bits (e.g., SECOND SECTOR STATUS INDICATOR (5:3) and THIRD SECTOR STATUS INDICATOR (8:6)) in a sequential manner, the sector status bits indicate that the FILLING (FIRST PROGRAM) and FILLING program operations have occurred to configure a given sector. But if the memory controller 22 retrieves sector status bits from the sector identification header/record wherein the second grouping of bits was programmed but not the third grouping of bits (e.g., 111_111_111_111_111_111_111_111_000_000), then this signals to the memory controller 22 that a brownout event may have occurred before the second program operation for the FILLING sector status program operation. This may occur if a brownout occurred while programming the status bits at the THIRD SECTOR STATUS INDICATOR (8:6), in which case the memory controller 22 concludes that the sector is an empty sector, and again programs the status bits at the SECOND SECTOR STATUS INDICATOR (5:3) and THIRD SECTOR STATUS INDICATOR (8:6) to classify the sector as a currently filling sector.

Likewise, if the fourth and fifth groupings of three status bits (e.g., FOURTH SECTOR STATUS INDICATOR (11:9) and FIFTH SECTOR STATUS INDICATOR (14:12)) are sequentially programmed to indicate that the PREVIOUS SECTOR BEING ERASED and PREVIOUS SECTOR QUALIFIED ERASE program operations have occurred, any retrieval of sector status bits wherein the fourth (but not the fifth) grouping of bits was programmed (e.g., 111_111_111_111_111_111_000_000_000_000), this signals that a brownout event may have occurred before the PREVIOUS SECTOR QUALIFIED ERASE program operation. This may occur if a brownout occurred while programming the status bits at the FIFTH SECTOR STATUS INDICATOR (14:12), in which case the memory controller 22 concludes that the sector is a filling sector, and again programs the status bits at the FOURTH SECTOR STATUS INDICATOR (11:9) and FIFTH SECTOR STATUS INDICATOR (14:12) to classify the sector to indicate that the previous sector is qualified for erase.

In similar fashion, if the sixth and seventh groupings of three status bits (e.g., SIXTH SECTOR STATUS INDICATOR (17:15) and SEVENTH SECTOR STATUS INDICATOR (20:18)) are sequentially programmed to indicate that the PREVIOUS SECTOR ERASED COMPLETE and ERASE COMPLETED program operations have occurred, any retrieval of sector status bits wherein the sixth (but not the seventh) grouping of bits was programmed (e.g., 111_111_111_111_000_000_000_000_000_000), this signals that a brownout event may have occurred before the ERASE COMPLETED program operation. This may occur if a brownout occurred while programming the status bits at the SEVENTH SECTOR STATUS INDICATOR (20:18), in which case the memory controller 22 concludes that the sector is PREVIOUS SECTOR QUALIFIED FOR ERASE, and again programs the status bits at the SIXTH SECTOR STATUS INDICATOR (17:15) and SEVENTH SECTOR STATUS INDICATOR (20:18) to classify the sector to indicate the erase operation is completed.

Finally, if the eighth and ninth groupings of three status bits (e.g., EIGHTH SECTOR STATUS INDICATOR (23: 21) and NINTH SECTOR STATUS INDICATOR (26:24)) are sequentially programmed to indicate that the COMPRESS (FIRST PROGRAM) and COMPRESS program operations have occurred, any retrieval of sector status bits wherein the eighth (but not the ninth) grouping of bits was programmed (e.g., 111_111_000_000_000_000_000_000_000_000), this signals that a brownout event may have occurred before the COMPRESS program operation. This may occur if a brownout occurred while programming the status bits at the NINTH SECTOR STATUS INDICATOR (26:24), in which case the memory controller 22 concludes that the sector erase operation is complete, and again programs the status bits at the EIGHTH SECTOR STATUS INDICATOR (23: 21) and NINTH SECTOR STATUS INDICATOR (26:24) to classify the sector to indicate the compression operation is completed.

As described herein, the sector identification status bits may be used by the memory controller 22 to define unique sector status update steps which align with the lifecycle of a sector in an emulated EEPROM system. To accomplish this, each sector's classification progression (e.g., from ERASED to READY) is marked by two distinct program operations to make them brownout tolerant. A failure to program on the first step is allowed if it can successfully be qualified by the second program operation. By using two program steps for every new sector classification progression, brownout issues can be detected and avoided.

As will be appreciated, one or more sectors or blocks of records may have a program or erase error that cannot be resolved during the emulated EEPROM operations. In such cases, the failed sector is declared invalid and is dropped from the emulated EEPROM operations so that subsequent passes through the flash memory array automatically skip this sector automatically. This is known as a dropped or dead sector. To skip over dead sectors, selected embodiments of the present disclosure provide a sector identification scheme having the capability to automate tracking of dead sectors within the system. To this end, each sector identification header/record stores one or more offsets flags which allow for forward or reverse passage through the sector and will warn of an impending encounter with a dead sector.

Figure 3:
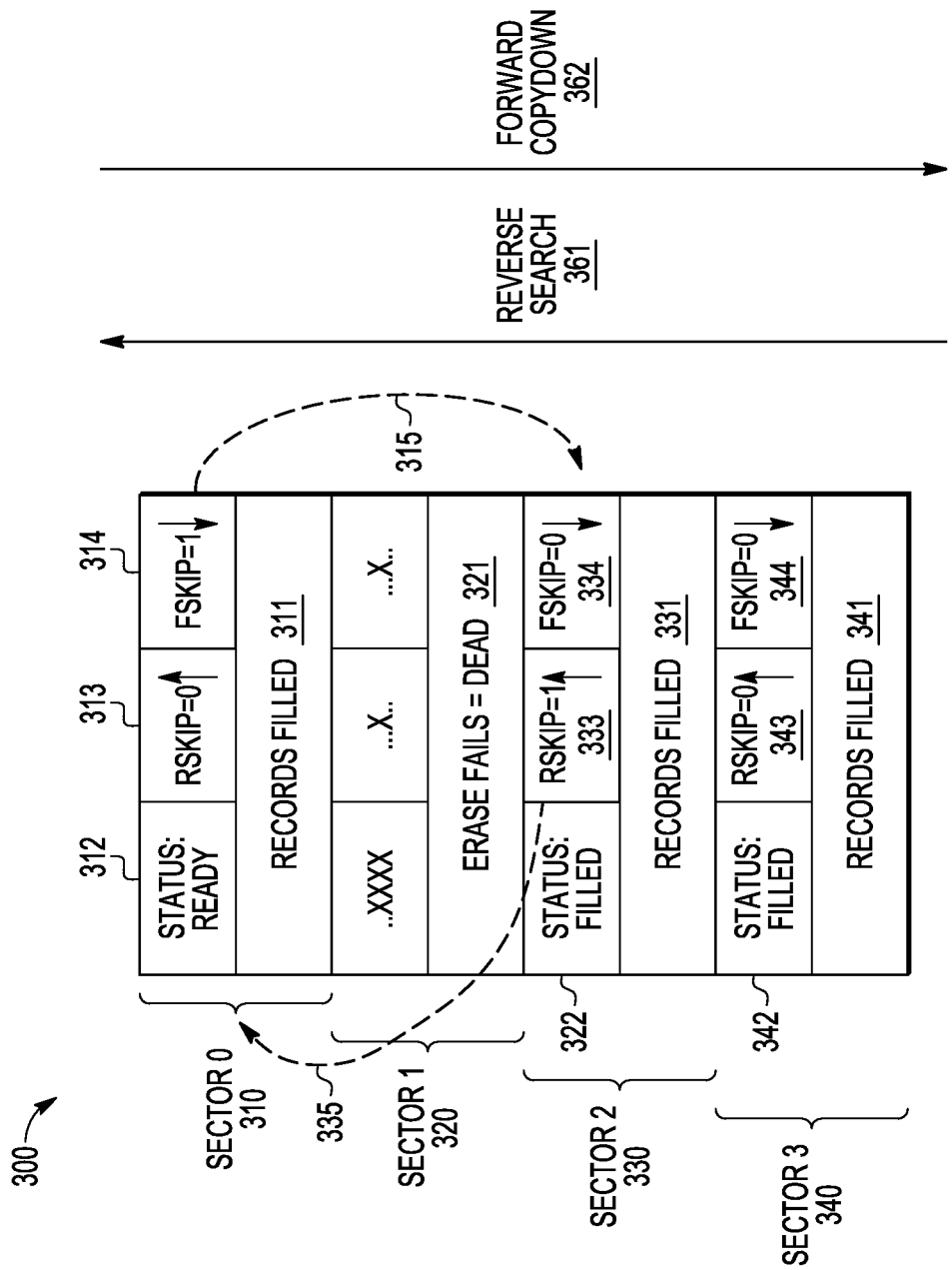
FIG. 3 is a block diagram illustrating a plurality of flash array sectors in an EEPROM emulation scheme which uses sector identification header codes to skip a dead sector in both automated search and copydown sequences in accordance with selected embodiments of the present disclosure.

Referring now to FIG. 3, there is shown a block diagram 300 of a plurality of flash array sectors 310, 320, 330, 340 in an EEPROM emulation scheme which uses sector identification header codes (e.g., 312-314) to skip a dead sector in both automated search and copydown sequences in accordance with selected embodiments of the present disclosure. In the first sector 310 (Sector 0), the header codes include a status bits field 312 for storing sector identification status bits identifying the status (e.g., ERASED, FILLED, etc.) for that sector, a reverse skip field 313 for specifying the presence of any upcoming dead sectors to be skipped during reverse passage through the sectors, a forward skip field 314 for specifying the presence of any upcoming dead sectors to be skipped during forward passage through the sectors, and additional locations 311 for storing records for the first sector 310. The other flash array sectors 320, 330, 340 are similarly organized with status bits fields (e.g., 332, 342), reverse skip fields (e.g., 333, 343), forward skip fields (e.g., 334, 344), and additional record fields (e.g., 331, 341), except for any dead sector (e.g., 320) where the various fields are indicated with the "don't care" value X.

In the depicted example, an erase failure at the second sector 320 (Sector 1) causes the second sector to be treated as a dead sector. To avoid the dead sector 320 (Sector 1), the sector identification location/record 332-334 for the third sector 330 (Sector 2) is programmed to store a reverse skip code value RSKIP=1 at the reverse offset flag field 333, thereby instructing any reverse search sequence 361 to skip 335 a single sector after processing the current sector 330 (Sector 2), thereby avoiding the dead sector 320 (Sector 1) and proceeding directly to the next functioning sector 310 (Sector 0). To avoid the dead sector 320 (Sector 1) from the opposite or copydown direction, the sector identification location/record 312-314 for the first sector 310 (Sector 0) is programmed to store a forward skip code value FSKIP=1 at the forward offset flag field 314, thereby instructing any forward copydown sequence 362 to skip 315 a single sector after processing the first sector 310 (Sector 0), thereby avoiding the dead sector 320 (Sector 1) and proceeding directly to the next functioning sector 330 (Sector 2). In similar fashion, the remaining sector identification header codes are programmed to provide reverse skip code values RSKIP=0 and forward skip code values FSKIP=0 to indicate that there is no adjacent dead sector so that reverse search and forward copydown sequences can proceed directly to the next adjacent sector.

To identify the number of sectors to be skipped, the reverse and forward skip fields may include a plurality of bits (e.g., 2) assigned to each sector skipped. For example, if a maximum of two sectors can be skipped in the reverse direction and two bits are assigned to each sector skipped, then RSKIP=1111 would indicate that no sector skipping is required (or RSKIP=0). Likewise, RSKIP=1100 would indicate that one adjacent sector should be skipped (or RSKIP=1), and RSKIP=0000 would indicate that two adjacent sectors should be skipped (or RSKIP=2).

Figure 4:
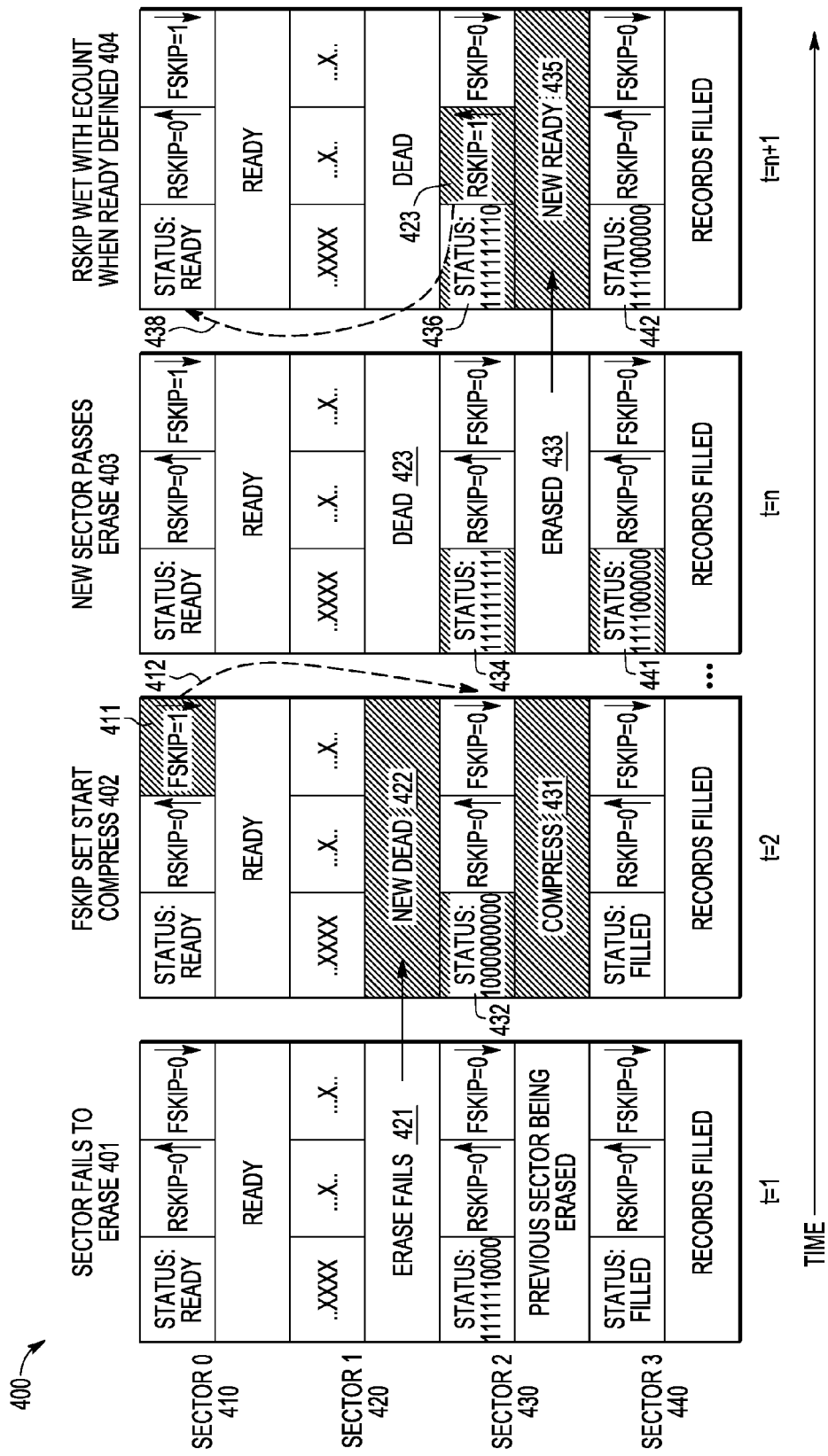
FIG. 4 is a block diagram of a plurality of flash array sectors in an EEPROM emulation scheme illustrating an example sequence for programming sector identification header codes to skip a dead sector in both automated search and copydown sequences in accordance with selected embodiments of the present disclosure.

To avoid the computational cost, complexity and delay from storing dead sector location information for retrieval and reference and processing by firmware, selected embodiments of the present disclosure program the reverse and forward skip codes or offset flag values directly in the sector header codes to enable automated sequence pass through of sectors from oldest to newest for copydown and in reverse for record search operations. To illustrate an example sequence for programming sector identification header codes, reference is now made to FIG. 4 where there is shown a block diagram 400 of a plurality of flash array sectors 410, 420, 430, 440 in an EEPROM emulation scheme over the course of time (e.g., t=1 through t=n+1). In the example flash array, each sector 410, 420, 430, 440 is organized with STATUS fields, reverse skip (RSKP) fields, forward skip (FSKP) fields, and additional record fields with their program status indicated (e.g., READY, COMPRESS, RECORDS FILLED, etc.).

At a first time interval (t=1), the flash array includes a first sector 410 (Sector 0) that is READY and a fourth sector 440 (Sector 3) that is FILLED. In addition and as indicated at 401, the sector records 421 at the second sector 420 (Sector 1) fail to erase, while the third sector 430 (Sector 2) includes a (previously programmed) STATUS field code (e.g., 11_1111_0000) indicating that the previous sector (e.g., Sector 1) is being erased. At this point in time, the STATUS and FSKP fields in the sectors 410 are programmed in the initial states to specify the respective status codes, along with skip or offset flag values RSKIP=0, FSKIP=0 indicating that no sectors are skipped.

At a second time interval (t=2), a forward skip is added to the sector identification location/record (sector ID) for the first sector 410 (Sector 0) if the following sector fails to erase (as indicated at 401). At this point, the status of the second and fourth sectors 420, 440 remain unchanged. However, the third sector 430 (Sector 2) includes a STATUS field 432 (e.g., 10_0000_0000) indicating that the records 431 in the third sector 430 are being compressed. In addition and as indicated at 402, a marker is placed in the sector identification location/record (sector ID) for the first sector 410 (Sector 0) to flag the upcoming DEAD sector 422 in the forward copydown direction. In particular, the forward skip field 411 in the first sector 410 is programmed to instructing any forward copydown sequence 412 to skip one sector (FSKP=1) after processing the first sector 410 (Sector 0), thereby avoiding the dead sector 420 (Sector 1) and proceeding directly to the next functioning sector 430 (Sector 2). Otherwise, the STATUS, RSKP, and FSKP fields in the sectors 410, 420, 430, 440 remain unchanged.

At a third, subsequent time interval (t=n), a new sector subsequent to the dead sector passes an ERASE change (as indicated at 403). At this point, the status of the first and second sectors 410, 420 remain unchanged. However, the sector records 433 at the third sector 430 (Sector 2) are now ERASED, and the fourth sector 440 (Sector 3) includes a STATUS field 441 (e.g., 11_1100_0000) indicating that the previous sector (Sector 2) erase is complete. Otherwise, the STATUS, RSKP, and FSKP fields in the sectors 410, 420, 430, 440 remain unchanged.

At a fourth time interval (t=n+1), a reverse skip (and optional ECOUNT value) are added to the sector identification location/record (sector ID) for the third sector 420 (Sector 2) after a successful erase operation (as indicated at 403). At this point, the status fields of the second and fourth sectors 420, 440 remain unchanged. However, the sector records 435 at the third sector 430 (Sector 2) are now READY, and the third sector 430 (Sector 2) includes a STATUS field 436 (e.g., 11_1111_1110) indicating that the records 435 in the third sector 430 are READY. In addition and as indicated at 404, a marker is placed in the sector identification location/record (sector ID) for the third sector 430 (Sector 2) to flag the upcoming DEAD sector 423 in the reverse search direction. In particular, the reverse skip field 437 is programmed in the third sector 430 to instructing any reverse search sequence 438 to skip one sector (RSKP=1) after processing the third sector 430 (Sector 1), thereby avoiding the dead sector 420 (Sector 1) and proceeding directly to the next functioning sector 410 (Sector 0). Otherwise, the STATUS, RSKP, and FSKP fields in the sectors 410, 420, 430, 440 remain unchanged.

Figure 5:
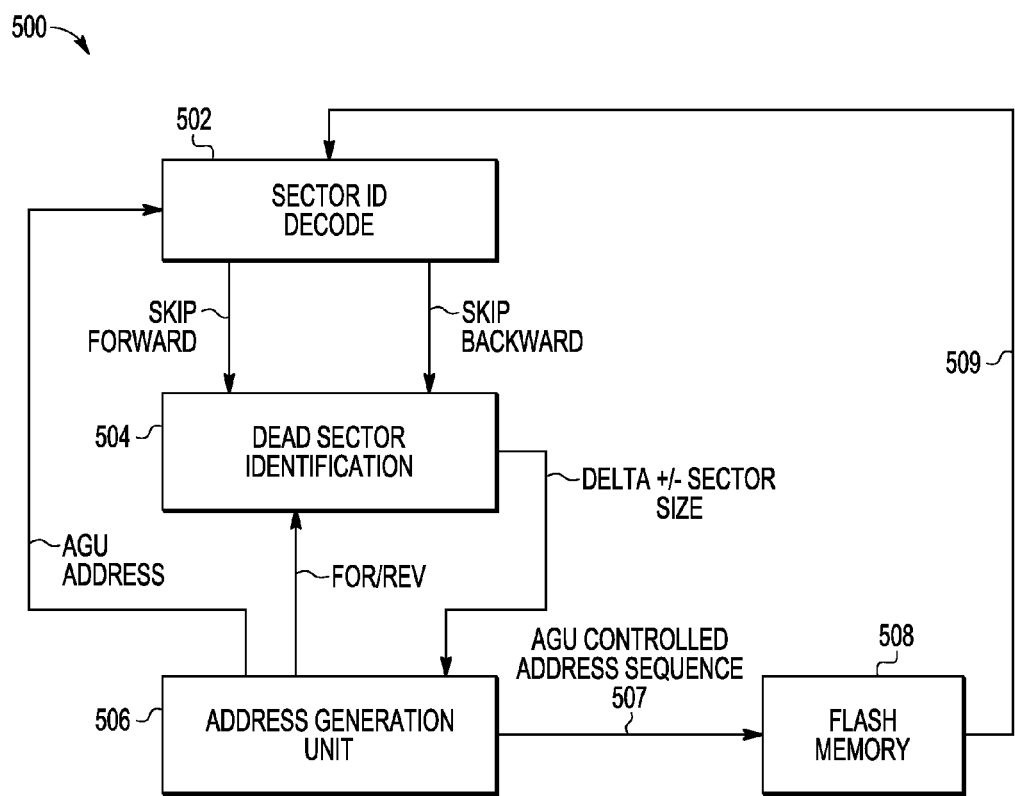
FIG. 5 is a schematic block diagram of an address generation unit which may be used to generate a controlled address sequence for a flash array in an EEPROM emulation unit in accordance with selected embodiments of the present disclosure.

Turning now to FIG. 5, there is shown a schematic block diagram 500 of an address generation unit 506 and associated control modules 502, 504 which may be used to generate a controlled address sequence for a flash array 508 in an EEPROM emulation unit in accordance with selected embodiments of the present disclosure. In selected embodiments, the address generation unit and associated control modules may be implemented in the memory controller of the emulated EEPROM device as software, hardware, firmware or any combination of the foregoing to provide the flash memory 508 with a controlled address sequence 507 for fully automating the search and copydown operations with programmed forward and reverse skip instructions to avoid dead sectors without requiring time consuming software interrupt routines to process dead sectors. Though not explicitly shown, the flash memory 508 stores a plurality of records arranged into sectors, each of which includes a sector identification location/record (sector ID) in which sector classification status codes and reverse and forward skip values have been programmed. As the records 509 are read out of the flash memory 508, the Sector ID Decode module 502 uses the associated AGU address received from the Address Generation Unit 506 to decode the records to identify any sector identification location/record (sector ID), and to extract therefrom the programmed reverse and forward skip values RSKP, FSKP. The extracted RSKP and FSKP values are provided as Skip Backward and Skip Forward skip sector count values to the Dead Sector Identification module 504, thereby indicating the number of sectors to skip in either the reverse or forward directions, respectively. To guide the computations at the Dead Sector Identification module 504, the Address Generation Unit 506 provides a Forward or Reverse indication (For/Rev) to the Dead Sector Identification module 504 to indicate whether the Address Generation Unit 506 is in forward copydown or reverse search mode. With these inputs, the Dead Sector Identification module 504 generates a sector size adjustment signal (Delta+/−Sector Size) by converting the sector skip counts into address adjustment values that are fed to the Address Generation Unit 506. Using the sector size adjustment signal, the Address Generation Unit 506 may be configured to generate a controlled address sequence 507 for automatically avoiding dead sectors during search and copydown operations at the flash memory 508.

Figure 6:
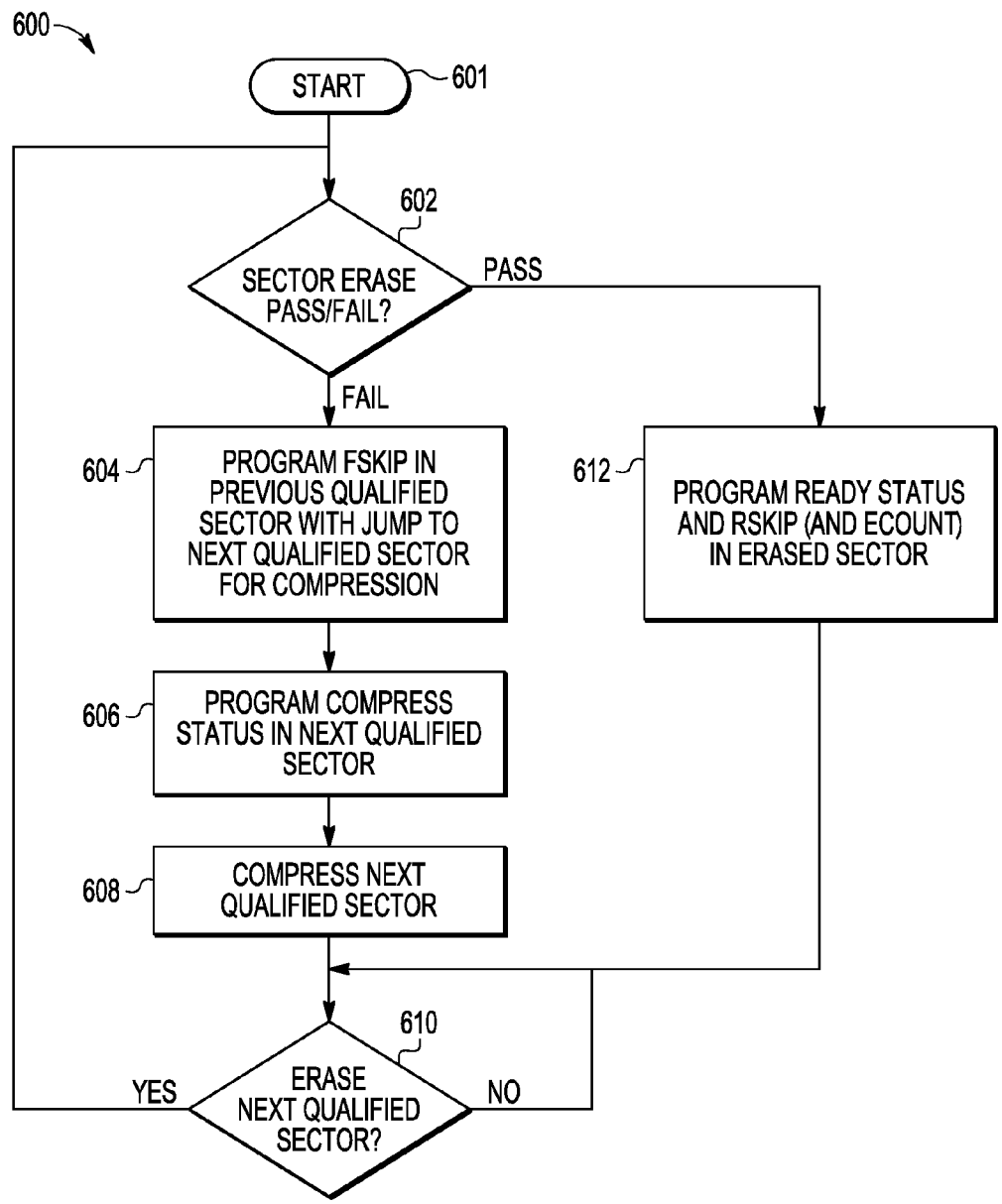
FIG. 6 is a simplified schematic flow chart illustrating various methods for using a flash memory to perform EEPROM emulation in accordance with selected embodiments of the invention.

To illustrate an example EEPROM emulation methodology for providing automated search and copydown operations with the disclosed sector identification header codes, reference is now made to FIG. 6 which shows a simplified schematic flow chart 600 illustrating various methods for programming reverse and forward skip values in accordance with selected embodiments of the invention. In the depicted methodology, the process begins at step 601 during forward copydown processing of an array of flash sectors as an erase operation is applied to a selected sector. If the sector erase operation fails (FAIL outcome to decision 602), the process programs the FSKIP value in the previous qualified sector with a jump value to the next qualified (e.g., non-dead) sector which is to be processed for compression. As the compression of the next qualified sector proceeds, the next qualified sector has its STATUS field programmed to indicate a COMPRESS status (at step 606) and the compression operation is performed on the records in the next qualified sector (at step 608).

At some subsequent point, an erase operation is performed on the next qualified sector. This can occur during a reverse search operation. Until such an erase operation occurs, the processing of the next qualified sector is on hold (negative outcome to decision 610). However, when an erase operation is undertaken on the next qualified sector (affirmative outcome to decision 610), the process returns to step 602 to evaluate the success of the erase operation. If the erase of the next qualified sector also fails, the process steps 604, 606, 608 are repeated as necessary or up until a specified limit, thereby updating the programmed FSKIP value to avoid the failed or dead sectors. However, if the sector erase operation succeeds (PASS outcome to decision 602), then the erased sector has its STATUS field programmed with the READY status at step 612. In addition, the processing at step 612 programs the RSKIP value in the erased sector with a jump value to the next qualified (e.g., non-dead) sector which is to be processed. In selected embodiments, an ECOUNT value may be included in the programming of the RSKIP value in the erased sector. Once the FSKIP and RSKIP values are programmed in the sectors adjacent to one or more dead sectors, the dead sector(s) are eliminated from the EEPROM emulation processing. After step 612, the process waits until an erase operation is applied to the next sector (step 610), at which time the process returns to step 602.

By now it should be appreciated that there is provided herein a method and apparatus for emulating EEPROM memory in non-volatile or flash memory. In the disclosed methodology and system, a sector identification record for a first non-volatile memory sector is programmed by storing a first status indicator in the sector identification record upon performing a first program operation on the first non-volatile memory sector. Subsequently, the sector identification record for the first non-volatile memory sector is programmed by storing a second status indicator in the sector identification record as part of a plurality of sector status bits upon performing a second program operation on the first non-volatile memory sector. In selected embodiments, the sector identification record may be programmed with the first status indicator by storing a first plurality of status bits in the plurality of sector status bits upon performing the first program operation, and may be programmed with the second status indicator by storing a second plurality of status bits in the plurality of sector status bits upon performing the second program operation, where the second plurality of status bits are stored adjacent to the first plurality of status bits and in more significant bit positions in the plurality of sector status bits. In the sector identification record, the plurality of sector status bits define a plurality of status indicators arranged sequentially to specify a plurality of sector configuration states for the first non-volatile memory sector, where the first and second program operations are required to change a sector configuration state for the first non-volatile memory sector. With this arrangement, a possible sector corrupting event associated with the first and second program operations may be detected upon determining that the sector identification record includes the first status indicator but not the second status indicator. In embodiments where the first and second program operations are, respectively, a READY FIRST program operation and a READY COMPLETE program operation, the first and second status indicators are, respectively, an ERASE COUNT value and a first group of least significant status bits stored in the plurality of sector status bit. In embodiments where the first and second program operations are, respectively, a FILLING FIRST program operation and a FILLING COMPLETE program operation, the first and second status indicators are, respectively, a first group of less significant status bits stored in the plurality of sector status bits and a second, adjacent group of more significant status bits stored in the plurality of sector status bits. In embodiments where the first and second program operations are, respectively, a PREVIOUS SECTOR BEING ERASED program operation and a PREVIOUS SECTOR QUALIFIED FOR ERASE program operation, the first and second status indicators are, respectively, a first group of less significant status bits stored in the plurality of sector status bits and a second, adjacent group of more significant status bits stored in the plurality of sector status bits. In embodiments where the first and second program operations are, respectively, a PREVIOUS SECTOR ERASE COMPLETE program operation and a ERASE COMPLETED program operation, the first and second status indicators are, respectively, a first group of less significant status bits stored in the plurality of sector status bits and a second, adjacent group of more significant status bits stored in the plurality of sector status bits. In embodiments where the first and second program operations are, respectively, a COMPRESS FIRST program operation and a COMPRESS COMPLETE program operation, the first and second status indicators are, respectively, a first group of less significant status bits stored in the plurality of sector status bits and a second, adjacent group of more significant status bits stored in the plurality of sector status bits. While programming the sector identification record with the first and second status indicators, it may be determined that the first non-volatile memory sector has failed to erase, in which case a sector identification record for a previous non-volatile memory sector that is adjacent to the first non-volatile memory sector may be programmed by storing a forward skip indicator in the sector identification record for the previous non-volatile memory sector to automatically bypass the first non-volatile memory sector during a forward copydown sequence. In addition or in the alternative, upon determining that a subsequent non-volatile memory sector adjacent to the first non-volatile memory sector is successfully erased, the sector identification record for the subsequent non-volatile memory sector may be programmed by storing a reverse skip indicator in the sector identification record for the subsequent non-volatile memory sector to automatically bypass the first non-volatile memory sector during a reverse search sequence.

In another form, there is provided an emulated EEPROM system which includes a volatile RAM, a non-volatile memory, and a control module. The volatile RAM is used to store and access data via one or more access requests. The non-volatile memory includes a plurality of sectors for storing records of the data stored in the volatile random access memory, where each sector includes a corresponding sector header for storing a plurality of sector status bits defining a plurality of status indicators arranged to sequentially specify a lifecycle sequence of sector configuration states for said sector. For example, the plurality of status bits may include a first plurality of status bits for programming a first status indicator upon performing a first program operation, and a second plurality of status bits for programming a second status indicator upon performing a second program operation, where the second plurality of status bits are stored adjacent to the first plurality of status bits and in more significant bit positions in the plurality of sector status bits. The sector header may also store a forward skip indicator for one or more adjacent dead sectors in the non-volatile memory which may be used to automatically bypass the one or more adjacent dead sectors during a forward copydown sequence, and/or a reverse skip indicator for one or more adjacent dead sectors in the non-volatile memory which may be used to automatically bypass the one or more adjacent dead sectors during a reverse search sequence. More generally, the sector header may store a sector skip indicator for one or more adjacent dead sectors in the non-volatile memory which may be used to automatically bypass the one or more adjacent dead sectors during automated search or copydown operations. In selected embodiments, the non-volatile memory may be implemented with NAND or NOR flash memory array for storing a plurality of flash memory sectors, each of which includes one or more EEPROM data records and a corresponding sector header record. The control module is coupled to the non-volatile memory and the volatile RAM, and is operable to program the plurality of sector status bits in the sector header of each sector with first and second program operations to change a sector configuration state for the sector. In selected embodiments, the control module includes an address generation unit for generating a controlled address sequence based on a sector size adjustment signal derived from the sector skip indicator in the sector header.

In yet another form, there is provided an emulated electrically erasable programmable read-only memory (EEPROM) device and associated method of operation. As disclosed, the EEPROM device includes an emulation memory having a plurality of sectors for sequentially storing information in a plurality of records, where each sector includes (1) a sector identification record for storing a plurality of sector status bits defining a plurality of status indicators arranged to sequentially specify a lifecycle sequence of sector configuration states for said sector, (2) a forward skip indicator for one or more adjacent dead sectors in the emulation memory which may be used to automatically bypass the one or more adjacent dead sectors during a forward copydown sequence, and (3) a reverse skip indicator for one or more adjacent dead sectors in the emulation memory which may be used to automatically bypass the one or more adjacent dead sectors during a reverse search sequence. The EEEPROM device also includes a memory controller coupled to the emulation memory, where the memory controller is operable to program the plurality of sector status bits in the sector identification record of each sector with first and second program operations to change a sector configuration state for the sector. In selected embodiments, the emulation memory may be implemented as a NAND or NOR flash memory for storing a plurality of flash memory sectors, each of which includes one or more EEPROM data records and a corresponding sector identification record.

Although the described exemplary embodiments disclosed herein are directed to a method and apparatus for detecting brownout events and automatically eliminating dead sector processing during search and copydown operations, the present invention is not necessarily limited to the example embodiments which illustrate inventive aspects of the present invention that are applicable to a wide variety of EEPROM emulation schemes. In addition, selected embodiments may be implemented with other memory systems, such as dynamic random-access memory (DRAM), static random-access memory (SRAM), magnetoresistive random-access memory (MRAM), or phase-change random access memory (PCRAM), or hard drive memory systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emulated EEPROM system comprising:
   a volatile random access memory for storing and accessing data via one or more access requests;
   a non-volatile memory comprising a plurality of sectors for storing records of the data stored in the volatile random access memory, each sector of the plurality of sectors comprising a corresponding sector header for storing a plurality of sector status bits defining a plurality of status indicators arranged to sequentially specify a lifecycle sequence of sector configuration states for said sector, where each sector header further comprises a sector skip indicator location for one or more adjacent dead sectors in the non-volatile memory for storing a sector skip indicator which may be used to automatically bypass the one or more adjacent dead sectors during automated search or copydown operations; and
   a control module coupled to the non-volatile memory and the volatile memory, where the control module is operable to program the plurality of sector status bits in the sector header of each sector with first and second program operations to change a sector configuration state for the sector, where the control module comprises an address generation unit for generating a controlled address sequence based on a sector size adjustment signal derived from the sector skip indicator in the sector header.

2. The emulated EEPROM system of claim 1, where the non-volatile memory comprises a flash memory for storing a plurality of flash memory sectors, each of which includes one or more EEPROM data records and a corresponding sector header record.

3. The emulated EEPROM system of claim 2, where flash memory comprises a NAND flash array or a NOR flash array.

4. The emulated EEPROM system of claim 1, wherein the plurality of sector status bits comprises:
  a first plurality of status bits for programming a first status indicator upon performing a first program operation, and
  a second plurality of status bits for programming a second status indicator upon performing a second program operation,
  where the second plurality of status bits are stored adjacent to the first plurality of status bits and in more significant bit positions in the plurality of sector status bits.

5. The emulated EEPROM system of claim 1, where each sector header further comprises a forward skip indicator location for one or more adjacent dead sectors in the non-volatile memory for storing a forward skip indicator which may be used to automatically bypass the one or more adjacent dead sectors during a forward copydown sequence.

6. The emulated EEPROM system of claim 1, where each sector header further comprises a reverse skip indicator location for one or more adjacent dead sectors in the non-volatile memory for storing a reverse skip indicator which may be used to automatically bypass the one or more adjacent dead sectors during a reverse search sequence.

7. An emulated electrically erasable programmable read-only memory (EEEPROM) device, comprising:
  an emulation memory having a plurality of sectors for sequentially storing information in a plurality of records, each sector comprising:
    a sector identification record location for storing a plurality of sector status bits defining a plurality of status indicators arranged to sequentially specify a lifecycle sequence of sector configuration states for said sector,
    a forward skip indicator location for one or more adjacent dead sectors in the emulation memory which may be used to automatically bypass the one or more adjacent dead sectors during a forward copydown sequence, and
    a reverse skip indicator location for one or more adjacent dead sectors in the emulation memory which may be used to automatically bypass the one or more adjacent dead sectors during a reverse search sequence; and
  a memory controller coupled to the emulation memory, where the memory controller is operable to program the plurality of sector status bits in the sector identification record of each sector with first and second program operations to change a sector configuration state for the sector.

8. The EEEPROM device of claim 7, where the emulation memory comprises a flash memory for storing a plurality of flash memory sectors, each of which includes one or more EEPROM data records and a corresponding sector identification record.

9. The EEEPROM device of claim 7, where the memory controller comprises an address generation unit for generating a controlled address sequence based on a sector size adjustment signal derived from a forward skip indicator stored in the forward skip indicator location.

10. The EEEPROM device of claim 7, where the memory controller comprises an address generation unit for generating a controlled address sequence based on a sector size adjustment signal derived from a reverse skip indicator stored in the reverse skip indicator location.

* * * * *